(12) United States Patent
Liu et al.

(10) Patent No.: US 11,112,579 B2
(45) Date of Patent: Sep. 7, 2021

(54) OPTICAL LENS ASSEMBLY

(71) Applicant: Zhejiang Sunny Optical Co., Ltd, Ningbo (CN)

(72) Inventors: Binbin Liu, Ningbo (CN); Jianke Wenren, Ningbo (CN); Fujian Dai, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 552 days.

(21) Appl. No.: 16/067,116

(22) PCT Filed: Oct. 23, 2017

(86) PCT No.: PCT/CN2017/107329
§ 371 (c)(1),
(2) Date: Jun. 28, 2018

(87) PCT Pub. No.: WO2018/218855
PCT Pub. Date: Dec. 6, 2018

(65) Prior Publication Data
US 2021/0048607 A1 Feb. 18, 2021

(30) Foreign Application Priority Data

May 27, 2017 (CN) .......................... 201710390727.9
May 27, 2017 (CN) .......................... 201720608670.0

(51) Int. Cl.
*G02B 9/34* (2006.01)
*G02B 13/18* (2006.01)

(52) U.S. Cl.
CPC ............... *G02B 9/34* (2013.01); *G02B 13/18* (2013.01)

(58) Field of Classification Search
CPC .................................. G02B 9/34; G02B 13/18
USPC ......................... 359/715, 753, 771, 772, 773
See application file for complete search history.

(56) References Cited

U.S. PATENT DOCUMENTS

| | | | |
|---|---|---|---|
| 2004/0218285 A1* | 11/2004 | Amanai | G02B 9/34 359/773 |
| 2010/0046090 A1 | 2/2010 | Okano | |
| 2011/0254992 A1 | 10/2011 | Abe | |
| 2016/0116706 A1 | 4/2016 | Hsu et al. | |

(Continued)

FOREIGN PATENT DOCUMENTS

| | | |
|---|---|---|
| CN | 101183168 | 5/2008 |
| CN | 201133964 | 10/2008 |
| CN | 101762864 | 6/2010 |

(Continued)

*Primary Examiner* — William Choi
(74) *Attorney, Agent, or Firm* — Hauptman Ham, LLP

(57) ABSTRACT

The present disclosure discloses an optical lens assembly. The optical lens assembly includes sequentially a first lens, a second lens, a third lens and a fourth lens from an object side to an image side along an optical axis. The first lens has a positive refractive power, and an object-side surface of the first lens is a convex surface. The second lens has a negative refractive power, and an object-side surface of the second lens is a concave surface. The third lens has a positive refractive power or a negative refractive power. The fourth lens has a negative refractive power. An air spacing T23 between the second lens and the third lens on the optical axis and an air spacing T34 between the third lens and the fourth lens on the optical axis satisfy: T23/T34<0.2.

17 Claims, 9 Drawing Sheets

(56) References Cited

U.S. PATENT DOCUMENTS

2016/0299320 A1    10/2016  Huang

FOREIGN PATENT DOCUMENTS

| CN | 101762864 A | * | 6/2010 |
| CN | 106556918 | | 4/2017 |
| CN | 206757165 | | 12/2017 |

* cited by examiner

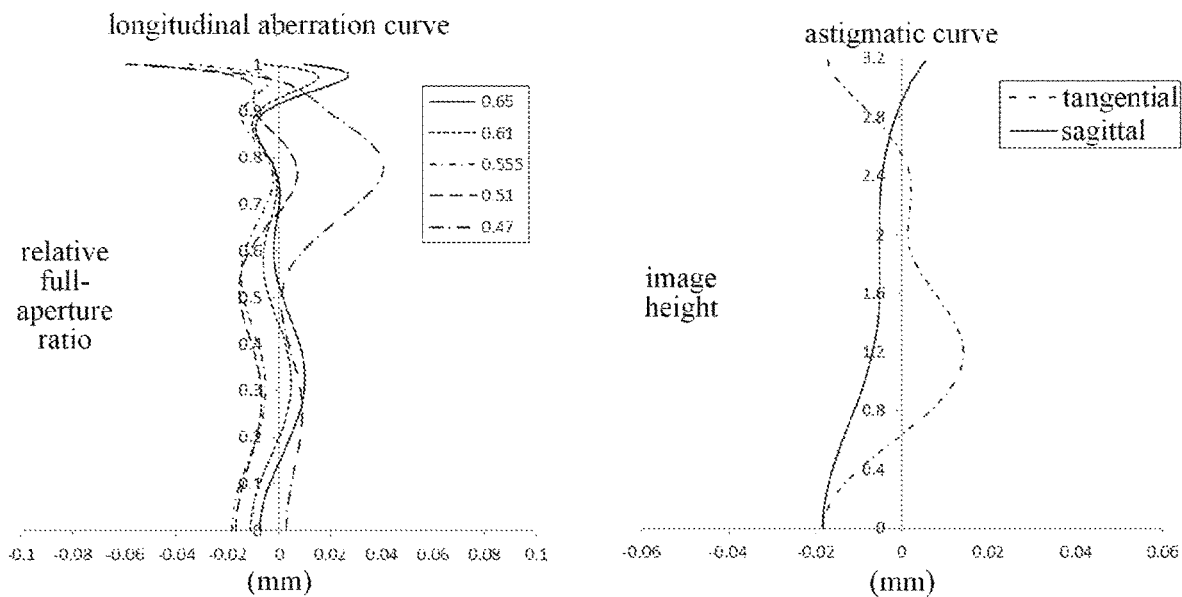
Fig. 4A
Fig. 4B
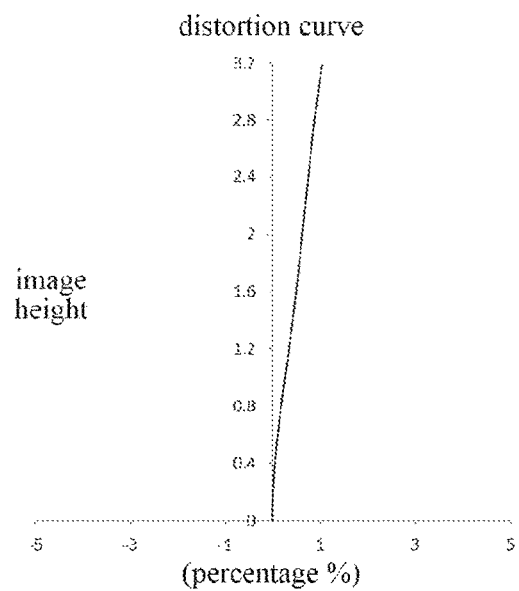
Fig. 4C

OPTICAL LENS ASSEMBLY

RELATED APPLICATIONS

The present application is a National Phase of International Application Number PCT/CN2017/107329, filed Oct. 23, 2017, and claims the priority of China Application No. 201710390727.9, filed May 27, 2017; and China Application No. 201720608670.0, filed May 27, 2017.

TECHNICAL FIELD

The present disclosure relates to an optical lens assembly, and more specifically to an optical lens assembly including four lenses.

BACKGROUND

In recent years, with the development of science and technology, portable electronic products such as cell phones and tablet computers are gradually emerging, and portable electronic products having camera functions are increasingly liked by people. Therefore, market demands for camera lens assemblies suitable for the portable electronic products are gradually increasing. However, as the portable electronic products tend to be miniaturized, light and thin, the total length of a lens assembly is limited, thereby increasing the design difficulty of the lens assembly. Meanwhile, with the improvement of the element performance and the reduction in size of an often used photosensitive element CCD (charge-coupled device) or CMOS (complementary metal-oxide semiconductor), etc., higher requirements on a high image quality and miniaturization of the lens assembly used in combination have been brought forward.

In order to meet the miniaturization requirement and simultaneously achieve a telephoto effect of the lens assembly, it is required to take into account a good image quality while shortening the length of the lens assembly, thereby achieving a clear imaging of a longer focal length.

Therefore, there is a need for a miniaturized optical lens assembly having a long focal length and high resolution that can be applied to the portable electronic products.

SUMMARY

Technical solutions provided by the present disclosure solve at least some of the above-mentioned technical problems.

An optical lens assembly is provided according to an aspect of the present disclosure. The optical lens assembly includes sequentially a first lens, a second lens, a third lens and a fourth lens from an object side to an image side along an optical axis. The first lens may have a positive refractive power, and an object-side surface of the first lens may be a convex surface. The second lens may have a negative refractive power, and an object-side surface of the second lens may be a concave surface. The third lens may have a positive refractive power or a negative refractive power. The fourth lens may have a negative refractive power. An air spacing T23 between the second lens and the third lens on the optical axis and an air spacing T34 between the third lens and the fourth lens on the optical axis may satisfy: $T23/T34<0.2$.

In the present disclosure, multiple lenses (e.g., four lenses) are used. By reasonably distributing refractive powers of the lenses in the optical lens assembly, and air spacing between the lenses on the optical axis, the optical lens assembly achieves a telephoto effect while satisfying miniaturization.

An optical lens assembly is provided according to another aspect of the present disclosure. The optical lens assembly has a total effective focal length f, and includes sequentially a first lens, a second lens, a third lens and at least one subsequent lens from an object side to an image side along an optical axis. The first lens may have a positive refractive power, and an object-side surface of the first lens may be a convex surface. The second lens may have a negative refractive power, and an object-side surface of the second lens may be a concave surface. The third lens may have a positive refractive power or a negative refractive power. A combined refractive power of the first lens, the second lens and the third lens is a positive refractive power and a combined focal length f123 of the first lens, the second lens and the third lens and the total effective focal length f may satisfy: $0.6<f123/f<1.0$.

In an implementation, the at least one subsequent lens includes a fourth lens having a negative refractive power.

In an implementation, the air spacing T34 between the third lens and the fourth lens on the optical axis and a center thickness CT4 of the fourth lens on the optical axis may satisfy: $0.9<T34/CT4<1.4$.

In an implementation, a sum of center thicknesses $\Sigma CT$ of each of the first to fourth lenses on the optical axis and an axial distance TTL from the object-side surface of the first lens to an image plane of the optical lens assembly may satisfy: $0.4<\Sigma CT/TTL<0.6$.

In an implementation, an effective focal length f1 of the first lens and an effective focal length f2 of the second lens may satisfy: $|f1/f2|<1$.

In an implementation, an effective focal length f4 of the fourth lens and an effective focal length f3 of the third lens may satisfy: $|f4/f3|<1$.

In an implementation, a radius of curvature R2 of an image-side surface of the first lens and a radius of curvature R3 of the object-side surface of the second lens may satisfy: $0<(R2-R3)/(R2+R3)\leq1.0$.

In an implementation, an effective radius SD11 of the object-side surface of the first lens and an effective radius SD42 of an image-side surface of the fourth lens may satisfy: $1.0<SD11/SD42<1.5$.

In an implementation, a abbe number V2 of the second lens and a abbe number V1 of the first lens may satisfy: $|V2-V1|>30$.

In an implementation, the optical lens assembly has a half of a maximal field-of-view angle HFOV, and the half of the maximal field-of-view angle HFOV may satisfy: $HFOV\leq20°$.

In an implementation, the axial distance TTL from the object-side surface of the first lens to the image plane of the optical lens assembly and the total effective focal length f of the optical lens assembly may satisfy: $0.8<TTL/f<1.05$.

Through the above configurations, the optical lens assembly may further possess at least one of the following beneficial effects:

achieving a long focal length of the optical lens assembly;
improving resolution of the optical lens assembly;
an improved lens processability and assembling technology of the optical lens assembly;
a reduced sensitivity of the optical lens assembly;
correcting various aberrations; and improving the resolution and an image quality of the optical lens assembly.

BRIEF DESCRIPTION OF THE DRAWINGS

By describing non-limiting implementations below in detail with reference to the accompanying drawings, other features, objectives and advantages of the present invention will be more apparent. In the accompany drawings:

FIGS. 4A-4C respectively illustrate a longitudinal aberration curve, an astigmatic curve and a distortion curve of the optical lens assembly according to embodiment 2;

DETAILED DESCRIPTION OF EMBODIMENTS

Figure 1:
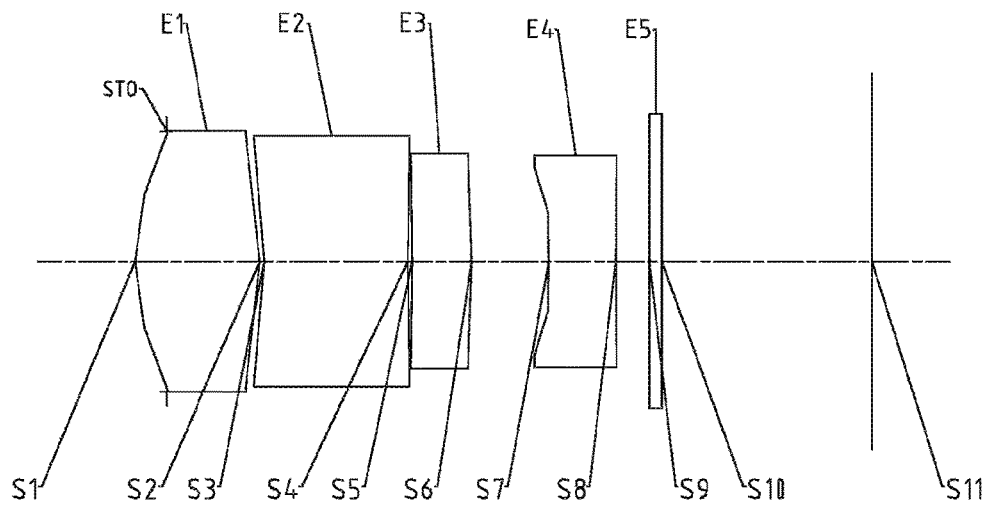
FIG. 1 illustrates a schematic structural diagram of an optical lens assembly according to embodiment 1 of the present disclosure.

Various aspects of the present disclosure will be described in more detail with reference to the accompanying drawings, so as to better understand the present disclosure. It should be appreciated that the detailed description is merely an explanation for exemplary implementations of the present disclosure, rather than a limitation to the scope of the present disclosure in any way. The same reference numerals designate the same elements throughout this specification. The expression "and/or" includes any and all combinations of one or more of the associated listed items.

It should be noted that, in the specification, expressions, such as "first," "second" and "third" are merely used to distinguish one feature from another feature, rather than represent any limitations to the features. Thus, a first lens discussed below may also be termed a second lens or a third lens without departing from the teachings of the present disclosure.

In the accompanying drawings, for the convenience of explanation, the thicknesses, sizes and shapes of lenses have been slightly exaggerated. Specifically, shapes of spherical surfaces or aspheric surfaces shown in the accompanying drawings are illustrated by examples. That is, shapes of the spherical surface or aspheric surfaces are not limited to the shapes of the spherical surfaces or the aspheric surfaces shown in the accompanying drawings. The accompanying drawings are merely examples, not strictly drawn to scale.

In this disclosure, a paraxial area indicates an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface closest to an object in each lens is referred to as an object-side surface, and a surface closest to an image plane in each lens is referred to as an image-side surface.

It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or combinations thereof. In addition, expressions, such as "at least one of," when preceding a list of elements, modify the entire list of elements rather than an individual element in the list. Further, the use of "may," when describing implementations of the present disclosure, relates to "one or more implementations of the present disclosure." Also, the term "exemplary" is intended to refer to an example or an illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

An optical lens assembly according to exemplary implementations of the present disclosure includes, for example, four lenses having refractive powers (i.e., a first lens, a second lens, a third lens and a fourth lens). The four lenses are arranged in sequence from an object side to an image side along an optical axis.

According to the exemplary implementations of the present disclosure, the first lens may have a positive refractive power, and an object-side surface of the first lens is a convex surface; the second lens may have a negative refractive power, and an object-side surface of the second lens is a concave surface; the third lens may have a positive refractive power or a negative refractive power; and the fourth lens may have a negative refractive power. The first lens, the second lens and the third lens are a first lens assembly, and a combined refractive power of the assembly is a positive refractive power. The fourth lens is a second lens assembly, and a combined refractive power of the assembly is a negative refractive power.

In the exemplary implementations, a half of a maximal field-of-view angle HFOV of the optical lens assembly may satisfy: HFOV≤20°, and more specifically, HFOV may further satisfy: 14.1°≤HFOV≤14.2°.

In the application, the refractive powers of the lenses may be reasonably distributed. An effective focal length f1 of the first lens and an effective focal length f2 of the second lens may satisfy: |f1/f2|<1, and more specifically, f1 and f2 may further satisfy: 0.35≤|f1/f2|≤0.60. An effective focal length f4 of the fourth lens and an effective focal length f3 of the third lens may satisfy: |f4/f3|<1, and more specifically, f4 and f3 may further satisfy: 0.00≤|f4/f3|≤0.61. The reasonable distribution of the refractive powers of the lenses is helpful to balance the refractive power of the optical lens assembly, to achieve a telephoto effect, and moderate the sensitivity of the optical lens assembly at the same time.

In the exemplary implementations, a combined focal length f123 of the first lens, the second lens and the third lens and a total effective focal length f of the optical lens assembly may satisfy: 0.6<f123/f<1.0, and more specifically, f123 and f may further satisfy: 0.79≤f123/f≤0.80. Through the reasonable distribution of the refractive powers, the telephoto effect of the optical lens assembly may be achieved.

In the application, center thicknesses of the lenses and spacing distances between the lenses may also be optimized. For example, an air spacing T34 between the third lens and the fourth lens on the optical axis and a center thickness CT4 of the fourth lens on the optical axis may satisfy: 0.9<T34/CT4<1.4, and more specifically, T34 and CT4 may further satisfy: 1.08≤T34/CT4≤1.16. As another example, an air spacing T23 between the second lens and the third lens on the optical axis and the air spacing T34 between the third lens and the fourth lens on the optical axis4 may satisfy: T23/T34<0.2, and more specifically, T23 and T34 may further satisfy: 0.06≤T23/T34≤0.11. The reasonable arrangement for the size structure of the optical lens assembly is helpful to realize the compression of the length size of the lens assembly, and ease the change of the direction after light enters the system, which is conducive to reducing the intensity of the stray light.

In addition, a sum of center thicknesses ΣCT of each of the first to fourth lenses on the optical axis and an axial distance TTL from the object-side surface of the first lens to an image plane of the optical lens assembly may satisfy: 0.4<ΣCT/TTL<0.6, and more specifically, ΣCT and TTL may further satisfy: 0.51≤ΣCT/TTL≤0.54, to help improve the processability of the lenses and the assembling technology of the lens assembly.

An effective radius SD11 of the object-side surface of the first lens and an effective radius SD42 of an image-side surface of the fourth lens may satisfy: 1.0<SD11/SD42<1.5, and more specifically, SD11 and SD42 may further satisfy: 1.23≤SD11/SD42≤1.45, to realize the compression of the lateral size of the optical lens assembly.

In the exemplary implementations, the axial distance TTL from the object-side surface of the first lens to the image plane of the optical lens assembly and the total effective focal length f of the optical lens assembly may satisfy: 0.8<TTL/f<1.05, and more specifically, TTL and f may further satisfy: 1.00≤TTL/f≤1.01. When the optical lens assembly satisfies the conditional expression 0.8<TTL/f<1.05, the reasonable arrangement for the refractive powers and the structural size of the system may be reflected, which is helpful to shorten the structural size of the system and realize miniaturization in the condition of ensuring the aberration balance.

In addition, radii of curvature of the lenses may also be reasonably distributed. For example, a radius of curvature R2 of an image-side surface of the first lens and a radius of curvature R3 of the object-side surface of the second lens may satisfy: 0<(R2−R3)/(R2+R3)≤1.0, and more specifically, R2 and R3 may further satisfy: 0.16≤(R2−R3)/(R2+R3)≤0.95.

The reasonable distribution for the radii of curvature of the lenses is conducive to reducing the axial aberration, to achieve the telephoto effect of the optical lens assembly, and to moderate the sensitivity of the optical lens assembly at the same time.

In the exemplary implementations, a abbe number V2 of the second lens and a abbe number V1 of the first lens may satisfy: |V2−V1|>30. More specifically, V2 and V1 may further satisfy: |V2−V1|=34.6. When the abbe number V2 of the second lens and the abbe number V1 of the first lens satisfy: |V2−V1|>30, it is helpful to correct the system chromatic aberration and improve the image quality of the optical lens assembly.

Alternatively, the optical lens assembly of the present disclosure may further include an optical filter for correcting color deviations chromatic aberrations. The optical filter may be arranged, for example, between the fourth lens and the image plane. It should be appreciated by those skilled in the art that the optical filter may be arranged at other positions according to the requirements.

The optical lens assembly according to the implementations of the present disclosure may use multiple lenses (e.g., the four lenses described above). By reasonably distributing the refractive powers, and surface types of the lenses, the axial spacing distances between the lenses, and so on, it is possible to ensure the long focal characteristics of the optical lens assembly, improve the system resolution, reduce the system sensitivity, ensure the miniaturization of the optical lens assembly and improve the image quality, to make the optical lens assembly more conducive to the production and processing and applicable to portable electronic products. In the implementations of the present disclosure, at least one of the mirror surfaces of the lenses is an aspheric mirror surface. An aspheric lens is characterized in that its curvature continuously changes from the lens center to the periphery. In contrast to a spherical lens having a constant curvature from the lens center to the periphery, the aspheric lens has a better radius-of-curvature characteristic, and has the advantages of improving the distortion aberration and the astigmatic aberration. The use of the aspheric lens can eliminate as much as possible the aberrations that occur during the imaging, thereby improving the image quality of the optical lens assembly.

However, it should be understood by those skilled in the art that, in a situation without departing from the technical solution claimed by the present disclosure, the number of lenses forming the optical lens assembly may be changed, to obtain the various results and advantages described in the specification. For instance, in the descriptions of the embodiments, an optical lens assembly having four lenses is described as an example, but the optical lens assembly is not limited to include four lenses. If necessary, the optical lens assembly may also include other numbers of lenses.

Specific embodiments applicable to the optical lens assembly of the above implementations will be further described below with reference to the accompanying drawings.

Embodiment 1

An optical lens assembly according to embodiment 1 of the present disclosure will be described below with reference to FIGS. 1-2C. FIG. 1 illustrates a schematic structural diagram of the optical lens assembly according to embodiment 1 of the present disclosure.

As shown in FIG. 1, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a positive refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 1 shows the surface type, the radius of curvature, the thickness, the material and the conic coefficient of each lens of the optical lens assembly in embodiment 1. The radius of curvature and the thickness are shown in millimeters (mm).

between the second lens E2 and the third lens E3 on the optical axis and the air spacing T34 between the third lens E3 and the fourth lens E4 on the optical axis satisfy: T23/T34=0.07. The air spacing T34 between the third lens E3 and the fourth lens E4 on the optical axis and the center thickness CT4 of the fourth lens E4 on the optical axis satisfy: T34/CT4=1.10. The abbe number V2 of the second lens E2 and the abbe number V1 of the first lens E1 satisfy: |V2−V1|=34.6.

In this embodiment, an optical lens assembly having four lenses is used as an example. By reasonably distributing the refractive powers of the lenses, the surface types of the lenses, the center thicknesses of the lenses and the spacing between the lenses, the optical lens assembly has the long focal length and the high resolution while satisfying the miniaturization. A surface type x of each aspheric surface is defined by the following formula:

$$x = \frac{ch^2}{1+\sqrt{1-(k+1)c^2h^2}} + \sum A_i h^i. \tag{1}$$

When an aspheric surface is at a height h along the optical axis, x is the distance sagittal height to the vertex of the aspheric surface; c is the paraxial curvature of the aspheric surface, and c=1/R (i.e., the paraxial curvature c is the reciprocal of the radius of curvature R in Table 1 above); k is the conic coefficient (given in Table 1 above); and Ai is the

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.5847 | | | |
| S1 | aspheric | 4.0954 | 2.0881 | 1.546 | 56.11 | −0.5082 |
| S2 | aspheric | −22.8363 | 0.0500 | | | −61.3683 |
| S3 | aspheric | −11.0750 | 2.5073 | 1.656 | 21.52 | −27.1140 |
| S4 | aspheric | 61.7984 | 0.0835 | | | −99.0000 |
| S5 | aspheric | 10.0596 | 1.0100 | 1.546 | 56.11 | −7.6193 |
| S6 | aspheric | 10.0193 | 1.2126 | | | 3.3371 |
| S7 | aspheric | 20.3440 | 1.1018 | 1.546 | 56.11 | −23.1485 |
| S8 | aspheric | 5.7369 | 0.6316 | | | 6.1886 |
| S9 | spherical | infinite | 0.2100 | 1.517 | 64.17 | |
| S10 | spherical | infinite | 3.6352 | | | |
| S11 | spherical | infinite | | | | |

Referring to Table 1, the radius of curvature R2 of the image-side surface S2 of the first lens E1 and the radius of curvature R3 of the object-side surface S3 of the second lens E2 satisfy: (R2−R3)/(R2+R3)=0.35. The air spacing T23 correction coefficient of the i-th order of the aspheric surface. Table 2 below shows the high-order coefficients $A_4$, $A_6$, $A_8$, $A_{10}$, $A_{12}$ and $A_{14}$ that can be applied to the aspheric mirror surfaces S1-S8 in embodiment 1.

TABLE 2

| surface number | A4 | A6 | A8 | A10 | A12 | A14 |
|---|---|---|---|---|---|---|
| S1 | −9.6000E−04 | −2.0000E−04 | −1.0000E−05 | −4.3000E−06 | 0 | 0 |
| S2 | −2.8000E−05 | −1.9000E−03 | 3.7400E−04 | −2.6000E−05 | 0 | 0 |
| S3 | 4.8200E−03 | −1.6000E−03 | 3.4900E−04 | −2.2000E−05 | 0 | 0 |
| S4 | −5.2000E−03 | −8.7800E−03 | −1.9000E−03 | 1.3900E−04 | 0 | 0 |
| S5 | −3.1000E−02 | 1.5400E−02 | −3.2000E−03 | 2.2600E−04 | 0 | 0 |
| S6 | −3.7500E−02 | 9.0700E−03 | −1.7000E−03 | 1.2900E−04 | 0 | 0 |
| S7 | −5.3400E−02 | 2.4300E−03 | −1.6000E−05 | 3.0300E−04 | −2.0000E−04 | 3.1300E−05 |
| S8 | −4.0600E−02 | 2.2000E−03 | 1.4700E−03 | −8.6000E−04 | 1.8600E−04 | −1.7000E−05 |

Table 3 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 1.

TABLE 3

| parameter | f1 (mm) | f2 (mm) | f3 (mm) | f4 (mm) | f (mm) | TTL (mm) | ImgH (mm) |
|---|---|---|---|---|---|---|---|
| numerical value | 6.54 | −14.12 | 583.47 | −15.04 | 12.43 | 12.53 | 3.18 |

According to Table 3, the effective focal length f1 of the first lens E1 and the effective focal length f2 of the second lens E2 satisfy: |f1/f2|=0.60. The effective focal length f4 of the fourth lens E4 and the effective focal length f3 of the third lens E3 satisfy: |f4/f3|=0.32. The axial distance TTL from the object-side surface S1 of the first lens E1 to the image plane S11 and the total effective focal length f of the optical lens assembly satisfy: TTL/f=1.01. In view of Table 1 and Table 3, it can be obtained that the sum of the center thicknesses ΣCT of each of the first to fourth lenses E1-E4 on the optical axis and the axial distance TTL from the object-side surface S1 of the first lens E1 to the image plane S11 satisfy: ΣCT/TTL=0.54.

In addition, in this embodiment, the half of the maximal field-of-view angle of the optical lens assembly HFOV=14.2°. The effective radius SD11 of the object-side surface S1 of the first lens E1 and the effective radius SD42 of the image-side surface S8 of the fourth lens E4 satisfy: SD11/SD42=1.31. The combined focal length f123 of the first lens E1, the second lens E2 and the third lens E3 and the total effective focal length f of the optical lens assembly satisfy: f123/f=0.79.

Figure 2A:
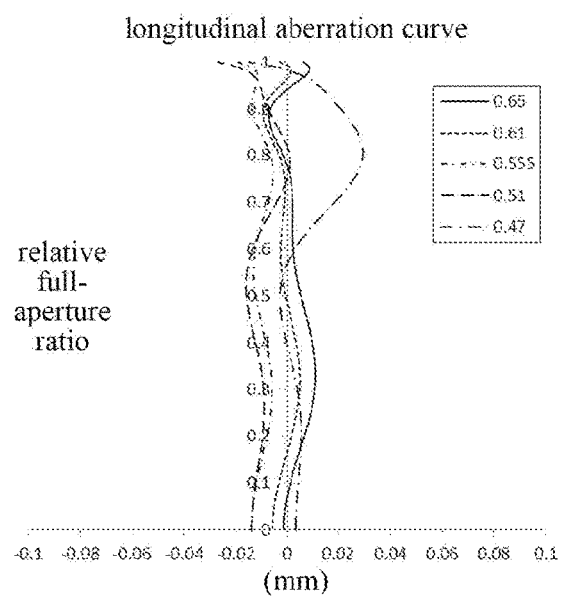
FIGS. 2A-2C respectively illustrate a longitudinal aberration curve, an astigmatic curve and a distortion curve of the optical lens assembly according to embodiment 1.
Figure 2B:
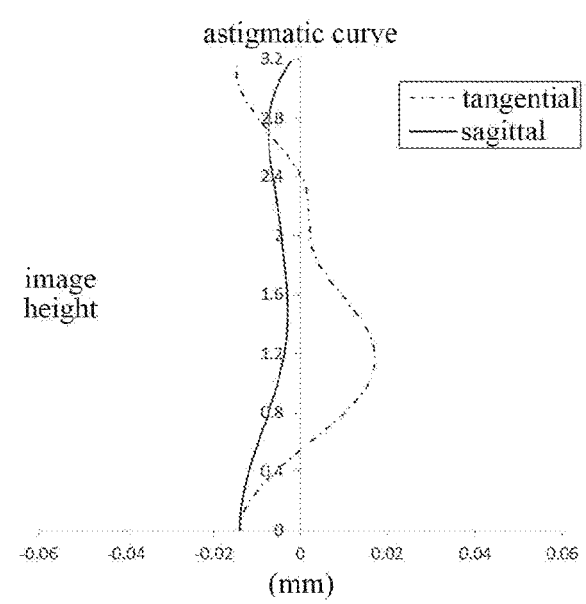
Figure 2C:
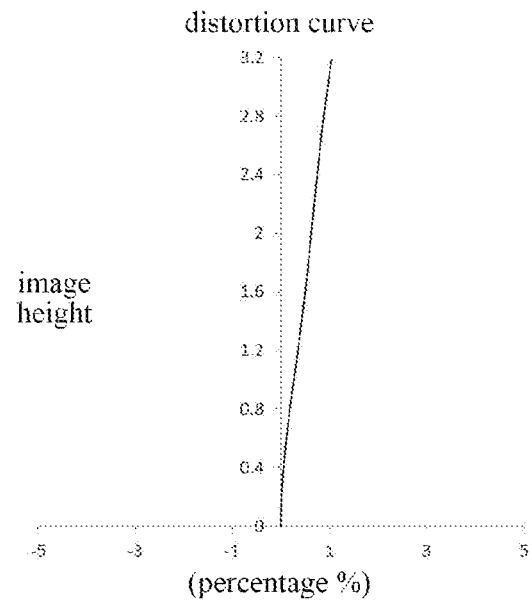

FIG. 2A illustrates a longitudinal aberration curve of the optical lens assembly according to embodiment 1, representing deviations of focal points of light of different wavelengths converged after passing through the optical lens assembly. FIG. 2B illustrates an astigmatic curve of the optical lens assembly according to embodiment 1, representing a curvature of a tangential image plane and a curvature of a sagittal image plane. FIG. 2C illustrates a distortion curve of the optical lens assembly according to embodiment 1, representing amounts of distortion at different viewing angles. It can be known according to FIGS. 2A-2C that the optical lens assembly provided in embodiment 1 can achieve a good image quality.

Embodiment 2

Figure 3:
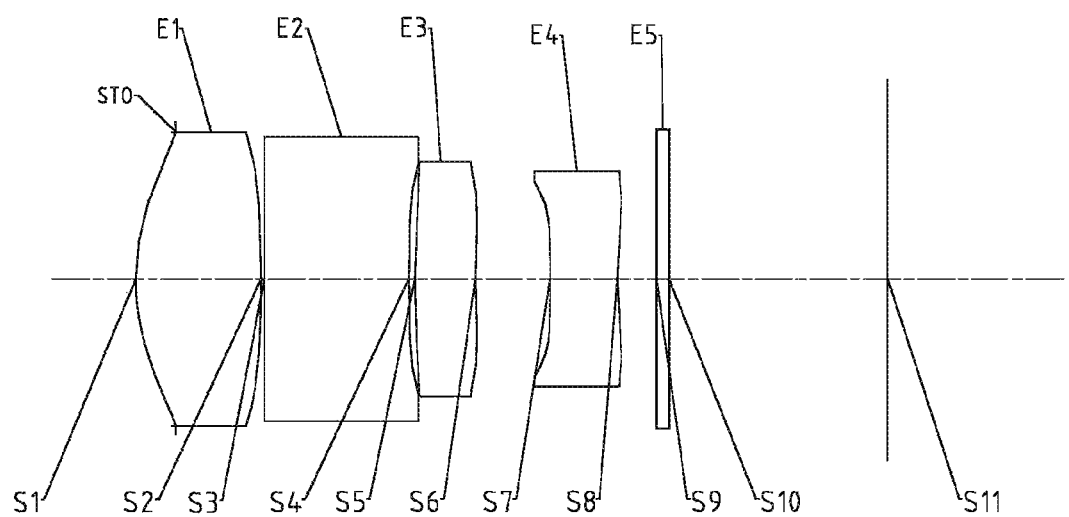
FIG. 3 illustrates a schematic structural diagram of an optical lens assembly according to embodiment 2 of the present disclosure.

An optical lens assembly according to embodiment 2 of the present disclosure is described below with reference to FIGS. 3-4C. In this embodiment and the following embodiments, for the purpose of brevity, the description of parts similar to those in embodiment 1 will be omitted. FIG. 3 illustrates a schematic structural diagram of the optical lens assembly according to embodiment 2 of the present disclosure.

As shown in FIG. 3, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a positive refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 4 shows the surface type, the radius of curvature, the thickness, the material and the conic coefficient of each lens of the optical lens assembly in embodiment 2. The radius of curvature and the thickness are shown in millimeters (mm). Table 5 shows the high-order coefficients of the aspheric mirror surfaces in embodiment 2. Table 6 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 2. A surface type of each aspheric surface may be defined by the formula (1) provided in embodiment 1.

TABLE 4

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.6388 | | | |
| S1 | aspheric | 4.0135 | 2.0840 | 1.546 | 56.11 | −0.4966 |
| S2 | aspheric | −24.6534 | 0.0220 | | | −58.7395 |
| S3 | aspheric | −11.1616 | 2.4443 | 1.656 | 21.52 | −27.6298 |
| S4 | aspheric | 50.0730 | 0.0923 | | | −82.7900 |
| S5 | aspheric | 10.0640 | 1.0100 | 1.546 | 56.11 | −8.2283 |
| S6 | aspheric | 9.7181 | 1.2424 | | | 4.9839 |
| S7 | aspheric | 18.9690 | 1.1212 | 1.546 | 56.11 | 6.3660 |
| S8 | aspheric | 5.6211 | 0.6502 | | | 6.0631 |
| S9 | spherical | infinite | 0.2100 | 1.517 | 64.17 | |
| S10 | spherical | infinite | 3.6537 | | | |
| S11 | spherical | infinite | | | | |

TABLE 5

| surface number | A4 | A6 | A8 | A10 | A12 | A14 |
|---|---|---|---|---|---|---|
| S1 | −9.6000E−04 | −2.0000E−04 | −1.0000E−05 | −4.3000E−06 | 0 | 0 |
| S1 | −9.8297E−04 | −1.5476E−04 | −1.6844E−05 | −4.4470E−06 | 0 | 0 |
| S2 | −1.9021E−04 | −1.7851E−03 | 3.2613E−04 | −2.1797E−05 | 0 | 0 |
| S3 | 4.7316E−03 | −1.4448E−03 | 3.0921E−04 | −1.8214E−05 | 0 | 0 |
| S4 | −5.0491E−03 | 8.6249E−03 | −1.8486E−03 | 1.2447E−04 | 0 | 0 |
| S5 | −3.1566E−02 | 1.5451E−02 | −3.1849E−03 | 2.2242E−04 | 0 | 0 |
| S6 | −3.7551E−02 | 9.4161E−03 | −1.8140E−03 | 1.4342E−04 | 0 | 0 |
| S7 | −5.2749E−02 | 2.7826E−03 | −2.9475E−04 | 4.4266E−04 | −2.4152E−04 | 3.6796E−05 |
| S8 | −4.0456E−02 | 2.2461E−03 | 1.3818E−03 | −8.4079E−04 | 1.8626E−04 | −1.8002E−05 |

TABLE 6

| parameter | f1 (mm) | f2 (mm) | f3 (mm) | f4 (mm) | f (mm) | TTL (mm) | ImgH (mm) |
|---|---|---|---|---|---|---|---|
| numerical value | 6.49 | −13.69 | 16690 | −15.08 | 12.56 | 12.53 | 3.18 |

FIG. 4A illustrates a longitudinal aberration curve of the optical lens assembly according to embodiment 2, representing deviations of focal points of light of different wavelengths converged after passing through the optical lens assembly. FIG. 4B illustrates an astigmatic curve of the optical lens assembly according to embodiment 2, representing a curvature of a tangential image plane and a curvature of a sagittal image plane. FIG. 4C illustrates a distortion curve of the optical lens assembly according to embodiment 2, representing amounts of distortion at different viewing angles. It can be known according to FIGS. 4A-4C that the optical lens assembly provided in embodiment 2 can achieve a good image quality.

Embodiment 3

Figure 5:
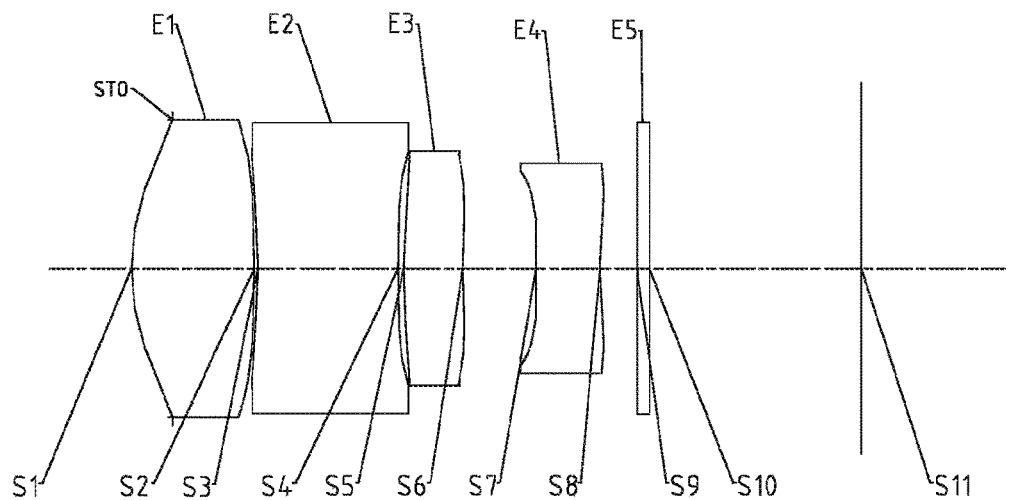
FIG. 5 is illustrates schematic structural diagram of an optical lens assembly according to embodiment 3 of the present disclosure.

An optical lens assembly according to embodiment 3 of the present disclosure is described below with reference to FIGS. 5-6C. FIG. 5 illustrates a schematic structural diagram of the optical lens assembly according to embodiment 3 of the present disclosure.

As shown in FIG. 5, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a positive refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 7 shows the surface type, the radius of curvature, the thickness, the material and the conic coefficient of each lens of the optical lens assembly in embodiment 3. The radius of curvature and the thickness are shown in millimeters (mm). Table 8 shows the high-order coefficients of the aspheric mirror surfaces in embodiment 3. Table 9 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 3. A surface type of each aspheric surface may be defined by the formula (1) provided in embodiment 1.

TABLE 7

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.6768 | | | |
| S1 | aspheric | 4.0185 | 2.1166 | 1.546 | 56.11 | −0.4606 |
| S2 | aspheric | −27.4263 | 0.0631 | | | −60.7129 |
| S3 | aspheric | −11.2348 | 2.3963 | 1.656 | 21.52 | −27.2086 |
| S4 | aspheric | 37.1650 | 0.1000 | | | −87.2996 |
| S5 | aspheric | 9.1293 | 1.0100 | 1.546 | 56.11 | −8.2628 |
| S6 | aspheric | 9.4671 | 1.2650 | | | 6.5794 |
| S7 | aspheric | 16.6904 | 1.0908 | 1.546 | 56.11 | 27.8019 |
| S8 | aspheric | 5.5696 | 0.6373 | | | 6.0206 |
| S9 | spherical | infinite | 0.2100 | 1.517 | 64.17 | |
| S10 | spherical | infinite | 3.6409 | | | |
| S11 | spherical | infinite | | | | |

TABLE 8

| surface number | A4 | A6 | A8 | A10 | A12 | A14 |
|---|---|---|---|---|---|---|
| S1 | −9.6000E−04 | −2.0000E−04 | −1.0000E−05 | −4.3000E−06 | 0 | 0 |
| S1 | −9.5776E−04 | −1.3906E−04 | −1.7316E−05 | −3.9531E−06 | 0 | 0 |
| S2 | −3.2613E−04 | −1.5910E−03 | 2.6821E−04 | −1.6899E−05 | 0 | 0 |
| S3 | 4.5629E−03 | −1.3099E−03 | 2.7187E−04 | −1.5392E−05 | 0 | 0 |
| S4 | −5.6317E−03 | 8.5925E−03 | −1.7499E−03 | 1.1178E−04 | 0 | 0 |
| S5 | −3.1859E−02 | 1.5468E−02 | −3.1500E−03 | 2.1747E−04 | 0 | 0 |
| S6 | −3.6185E−02 | 9.1878E−03 | −1.8097E−03 | 1.4458E−04 | 0 | 0 |
| S7 | −5.1734E−02 | 3.1290E−03 | −6.3174E−04 | 5.5784E−04 | −2.5819E−04 | 3.7214E−05 |
| S8 | −4.0498E−02 | 2.4209E−03 | 1.1661E−03 | −7.6995E−04 | 1.7626E−04 | −1.7802E−05 |

TABLE 9

| parameter | f1 (mm) | f2 (mm) | f3 (mm) | f4 (mm) | f (mm) | TTL (mm) | ImgH (mm) |
|---|---|---|---|---|---|---|---|
| numerical value | 6.58 | −12.89 | 227.98 | −15.86 | 12.55 | 12.53 | 3.18 |

Figure 6A:
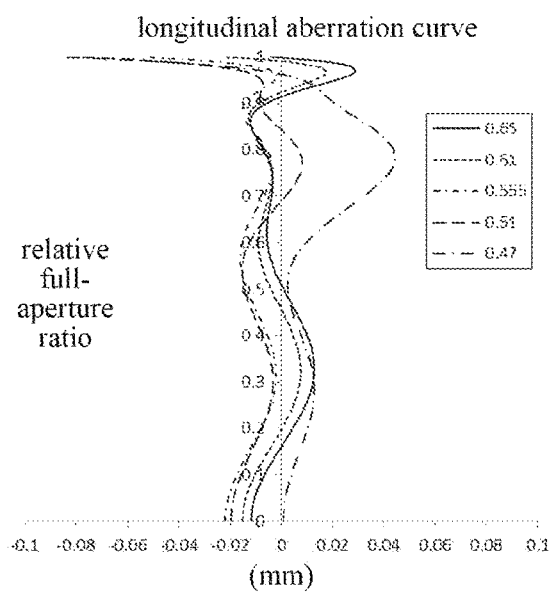
FIGS. 6A-6C respectively illustrate a longitudinal aberration curve, an astigmatic curve and a distortion curve of the optical lens assembly according to embodiment 3.
Figure 6B:
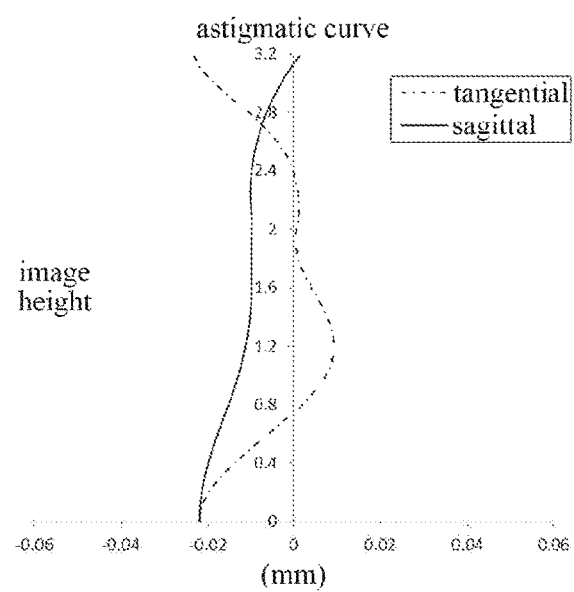
Figure 6C:
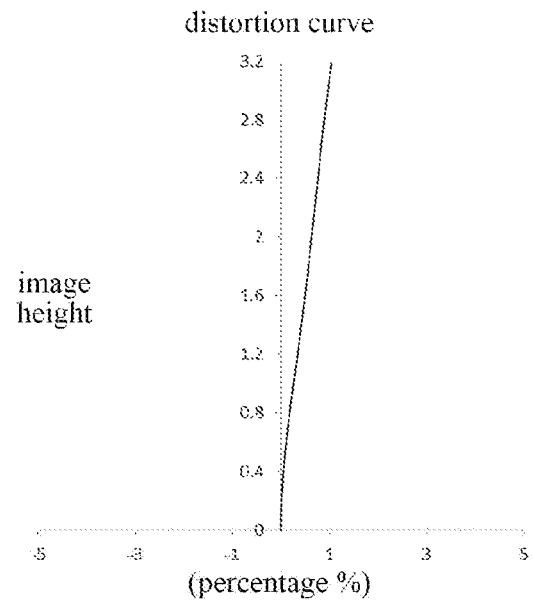

FIG. 6A illustrates a longitudinal aberration curve of the optical lens assembly according to embodiment 3, representing deviations of focal points of light of different wavelengths converged after passing through the optical lens assembly. FIG. 6B illustrates an astigmatic curve of the optical lens assembly according to embodiment 3, representing a curvature of a tangential image plane and a curvature of a sagittal image plane. FIG. 6C illustrates a distortion curve of the optical lens assembly according to embodiment 3, representing amounts of distortion at different viewing angles. It can be known according to FIGS. 6A-6C that the optical lens assembly provided in embodiment 3 can achieve a good image quality.

Embodiment 4

Figure 7:
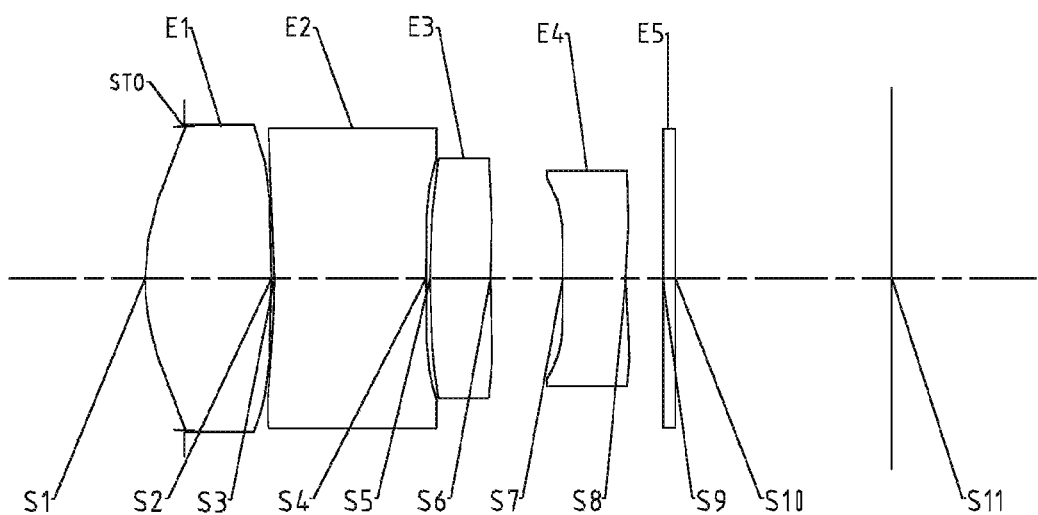
FIG. 7 illustrates a schematic structural diagram of an optical lens assembly according to embodiment 4 of the present disclosure.

An optical lens assembly according to embodiment 4 of the present disclosure is described below with reference to FIGS. 7-8C. FIG. 7 illustrates a schematic structural diagram of the optical lens assembly according to embodiment 4 of the present disclosure.

As shown in FIG. 7, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a positive refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 10 shows the surface type, the radius of curvature, the thickness, the material and the conic coefficient of each lens of the optical lens assembly in embodiment 4. The radius of curvature and the thickness are shown in millimeters (mm). Table 11 shows the high-order coefficients of the aspheric mirror surfaces in embodiment 4. Table 12 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 4. A surface type of each aspheric surface may be defined by the formula (1) provided in embodiment 1.

TABLE 10

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.6530 | | | |
| S1 | aspheric | 4.0663 | 2.1197 | 1.546 | 56.11 | −0.4715 |
| S2 | aspheric | −31.8743 | 0.0483 | | | −96.9039 |
| S3 | aspheric | −12.2450 | 2.5456 | 1.656 | 21.52 | −28.8472 |
| S4 | aspheric | 35.8546 | 0.0678 | | | 45.3025 |
| S5 | aspheric | 8.7858 | 1.0100 | 1.546 | 56.11 | −7.2186 |
| S6 | aspheric | 9.9413 | 1.2179 | | | 18.8341 |
| S7 | aspheric | 22.0526 | 1.0523 | 1.546 | 56.11 | 96.3169 |
| S8 | aspheric | 5.9053 | 0.6274 | | | 6.1947 |
| S9 | spherical | infinite | 0.2100 | 1.517 | 64.17 | |
| S10 | spherical | infinite | 3.6310 | | | |
| S11 | spherical | infinite | | | | |

TABLE 11

| surface number | A4 | A6 | A8 | A10 | A12 | A14 |
|---|---|---|---|---|---|---|
| S1 | −6.9929E−04 | −2.6008E−04 | 5.8927E−06 | −6.5022E−06 | 0 | 0 |
| S2 | −1.2074E−03 | −1.1305E−03 | 1.3988E−04 | −7.8622E−06 | 0 | 0 |
| S3 | 2.7431E−03 | −4.5763E−04 | 9.6079E−05 | −3.8713E−06 | 0 | 0 |
| S4 | −2.8930E−02 | 2.6648E−02 | −7.0799E−03 | 6.6678E−04 | 0 | 0 |
| S5 | −5.5932E−02 | 3.8146E−02 | −1.0291E−02 | 9.8777E−04 | 0 | 0 |
| S6 | −3.3314E−02 | 1.0221E−02 | −2.7824E−03 | 2.7229E−04 | 0 | 0 |
| S7 | −4.9298E−02 | 3.5203E−03 | −1.7875E−04 | −2.1692E−04 | 6.6080E−06 | 9.2997E−06 |
| S8 | −3.8349E−02 | 3.0474E−03 | 6.2855E−04 | −5.6109E−04 | 1.3101E−04 | −1.2095E−05 |

TABLE 12

| parameter | f1 (mm) | f2 (mm) | f3 (mm) | f4 (mm) | f (mm) | TTL (mm) | ImgH (mm) |
|---|---|---|---|---|---|---|---|
| numerical value | 6.75 | −13.62 | 105.8 | −15.12 | 12.43 | 12.53 | 3.18 |

Figures 8A, 8B:
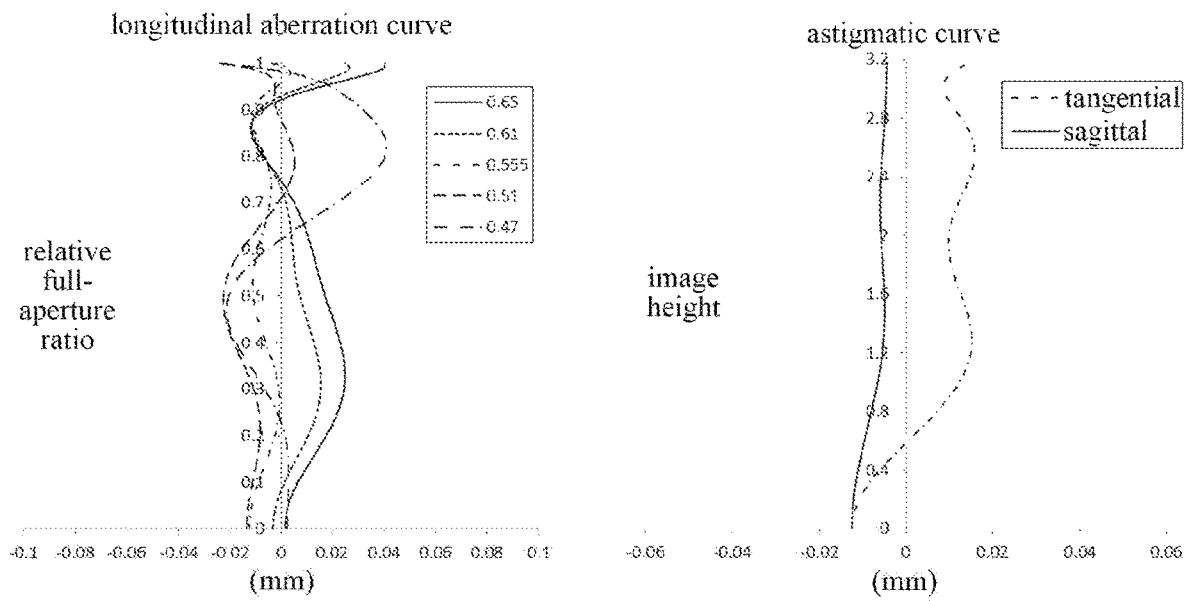
FIGS. 8A-8C respectively illustrate a longitudinal aberration curve, an astigmatic curve and a distortion curve of the optical lens assembly according to embodiment 4.
Figure 8C:
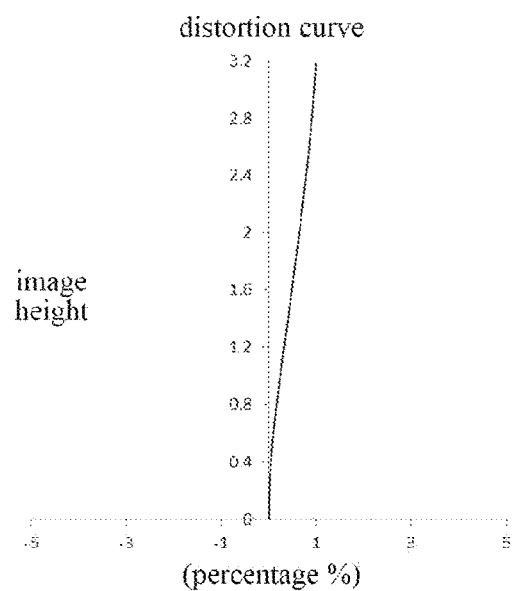

FIG. 8A illustrates a longitudinal aberration curve of the optical lens assembly according to embodiment 4, representing deviations of focal points of light of different wavelengths converged after passing through the optical lens assembly. FIG. 8B illustrates an astigmatic curve of the optical lens assembly according to embodiment 4, representing a curvature of a tangential image plane and a curvature of a sagittal image plane. FIG. 8C illustrates a distortion curve of the optical lens assembly according to embodiment 4, representing amounts of distortion at different viewing angles. It can be known according to FIGS. 8A-8C that the optical lens assembly provided in embodiment 4 can achieve a good image quality.

Embodiment 5

Figure 9:
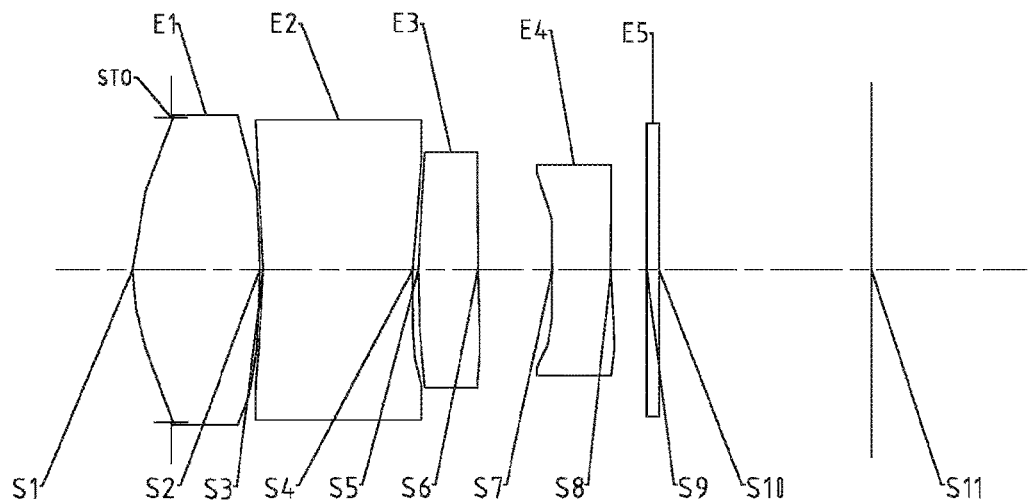
FIG. 9 illustrates a schematic structural diagram of an optical lens assembly according to embodiment 5 of the present disclosure.

An optical lens assembly according to embodiment 5 of the present disclosure is described below with reference to FIGS. 9-10C. FIG. 9 illustrates a schematic structural diagram of the optical lens assembly according to embodiment 5 of the present disclosure.

As shown in FIG. 9, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a positive refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 13 shows the surface type, the radius of curvature, the thickness, the material and the conic coefficient of each lens of the optical lens assembly in embodiment 5. The radius of curvature and the thickness are shown in millimeters (mm). Table 14 shows the high-order coefficients of the aspheric mirror surfaces in embodiment 5. Table 15 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 5. A surface type of each aspheric surface may be defined by the formula (1) provided in embodiment 1.

TABLE 13

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.8307 | | | |
| S1 | aspheric | 3.6819 | 2.2528 | 1.546 | 56.11 | −0.2543 |
| S2 | aspheric | −296.5785 | 0.4061 | | | 10776.9928 |
| S3 | aspheric | −8.2032 | 2.2540 | 1.656 | 21.52 | −16.3414 |
| S4 | aspheric | −37.7529 | 0.1000 | | | −20.7894 |
| S5 | aspheric | 133.9119 | 1.0588 | 1.546 | 56.11 | −3.4707E+13 |
| S6 | aspheric | −842.7588 | 0.9063 | | | 1.4448E+16 |
| S7 | aspheric | 17.0819 | 0.8364 | 1.546 | 56.11 | 58.7665 |
| S8 | aspheric | 5.2994 | 0.7340 | | | 5.1834 |
| S9 | spherical | infinite | 0.2100 | 1.517 | 64.17 | |
| S10 | spherical | infinite | 3.7376 | | | |
| S11 | spherical | infinite | | | | |

TABLE 14

| surface number | A4 | A6 | A8 | A10 | A12 | A14 |
|---|---|---|---|---|---|---|
| S1 | −4.4874E−04 | −1.7900E−04 | 5.3701E−05 | −9.2460E−06 | 0 | 0 |
| S2 | −5.5199E−03 | 2.2741E−03 | −5.7020E−04 | 3.9271E−05 | 0 | 0 |
| S3 | −2.8349E−03 | 2.6324E−03 | −6.5992E−04 | 5.4866E−05 | 0 | 0 |
| S4 | −1.7101E−03 | 4.6859E−03 | −8.4892E−04 | 5.3448E−05 | 0 | 0 |
| S5 | −1.8216E−02 | 6.8286E−03 | −6.8806E−04 | −2.5156E−05 | 0 | 0 |
| S6 | −2.3687E−02 | 5.9616E−03 | −2.5242E−04 | −5.7199E−05 | 0 | 0 |
| S7 | −6.2555E−02 | 2.2308E−03 | 4.5724E−03 | −2.1617E−03 | 4.3244E−04 | −4.0104E−05 |
| S8 | −5.5686E−02 | 8.4784E−03 | −8.1472E−04 | −2.3092E−04 | 7.4904E−05 | −9.3923E−06 |

TABLE 15

| parameter | f1 (mm) | f2 (mm) | f3 (mm) | f4 (mm) | f (mm) | TTL (mm) | ImgH (mm) |
|---|---|---|---|---|---|---|---|
| numerical value | 6.35 | −13.15 | −2647.6 | −15.42 | 12.43 | 12.53 | 3.18 |

Figure 10A:
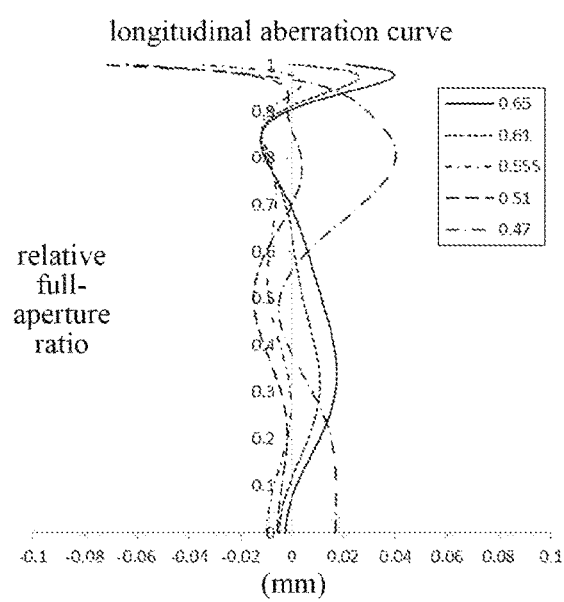
FIGS. 10A-10C respectively illustrate a longitudinal aberration curve, an astigmatic curve and a distortion curve of the optical lens assembly according to embodiment 5.
Figure 10B:
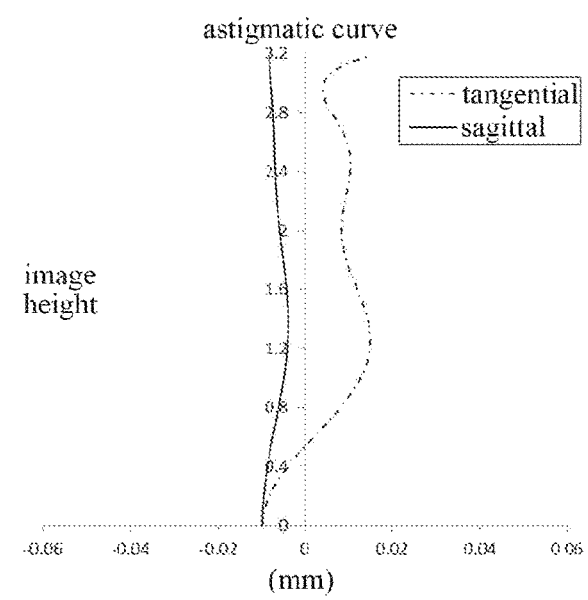
Figure 10C:
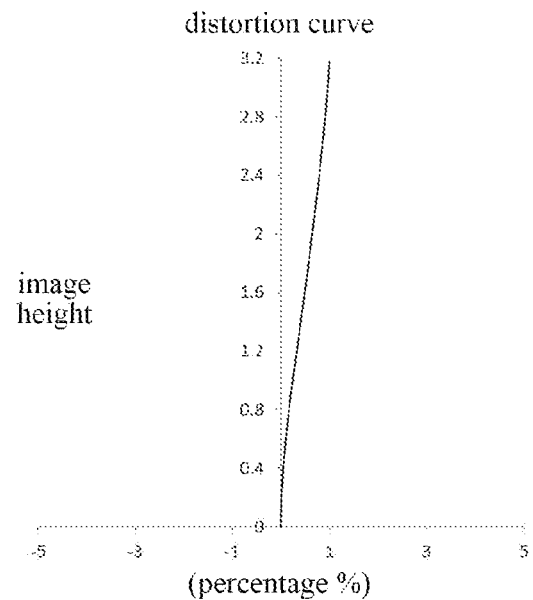

FIG. 10A illustrates a longitudinal aberration curve of the optical lens assembly according to embodiment 5, representing deviations of focal points of light of different wavelengths converged after passing through the optical lens assembly. FIG. 10B illustrates an astigmatic curve of the optical lens assembly according to embodiment 5, representing a curvature of a tangential image plane and a curvature of a sagittal image plane. FIG. 10C illustrates a distortion curve of the optical lens assembly according to embodiment 5, representing amounts of distortion at different viewing angles. It can be known according to FIGS. 10A-10C that the optical lens assembly provided in embodiment 5 can achieve a good image quality.

Embodiment 6

Figure 11:
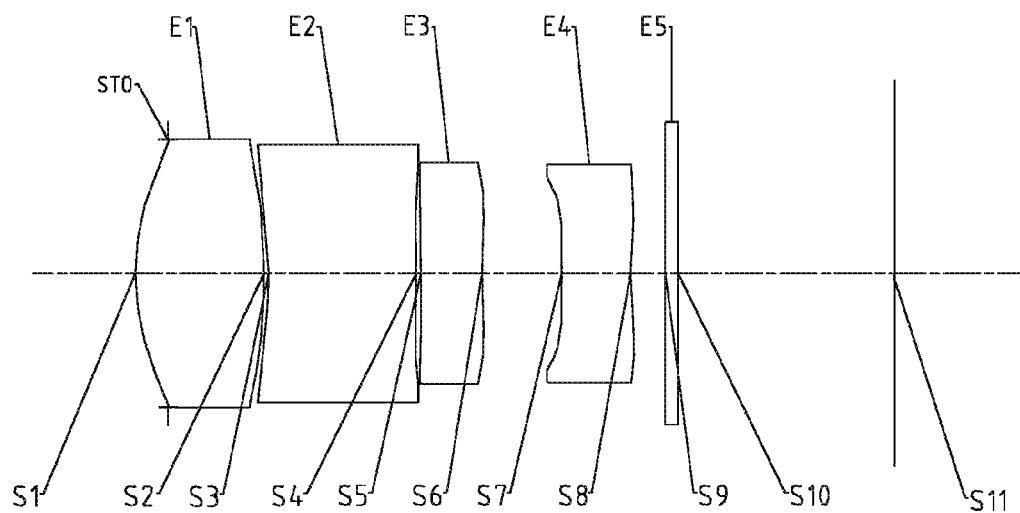
FIG. 11 illustrates a schematic structural diagram of an optical lens assembly according to embodiment 6 of the present disclosure.

An optical lens assembly according to embodiment 6 of the present disclosure is described below with reference to FIGS. 11-12C. FIG. 11 illustrates a schematic structural diagram of the optical lens assembly according to embodiment 6 of the present disclosure.

As shown in FIG. 11, the optical lens assembly includes, along an optical axis, four lenses E1-E4 arranged in sequence from an object side to an image side. A first lens E1 has a positive refractive power, and an object-side surface S1 and an image-side surface S2 of the first lens are aspheric surfaces. A second lens E2 has a negative refractive power, and an object-side surface S3 and an image-side surface S4 of the second lens are aspheric surfaces. A third lens E3 has a negative refractive power, and an object-side surface S5 and an image-side surface S6 of the third lens are aspheric surfaces. A fourth lens E4 has a negative refractive power, and an object-side surface S7 and an image-side surface S8 of the fourth lens are aspheric surfaces. Alternatively, the optical lens assembly may further include an optical filter E5 having an object-side surface S9 and an image-side surface S10. In the optical lens assembly of this embodiment, a diaphragm STO for limiting light beams may also be arranged, for example, between the object side and the first lens E1, to improve the image quality. Light from an object sequentially passes through the surfaces S1 to S10 and finally forms an image on an image plane S11.

Table 16 shows the surface type, the radius of curvature, the thickness, the material and the conic coefficient of each lens of the optical lens assembly in embodiment 6. The radius of curvature and the thickness are shown in millimeters (mm). Table 17 shows the high-order coefficients of the aspheric mirror surfaces in embodiment 6. Table 18 shows the effective focal lengths f1-f4 of the lenses, the total effective focal length f of the optical lens assembly, the axial distance TTL from the object-side surface S1 of the first lens E1 to the image plane S11, and the half of the diagonal length ImgH of the effective pixel area on the image plane S11 in embodiment 6. A surface type of each aspheric surface may be defined by the formula (1) provided in embodiment 1.

TABLE 16

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.5348 | | | |
| S1 | aspheric | 4.1319 | 2.1228 | 1.546 | 56.11 | −0.4528 |
| S2 | aspheric | −9.6395 | 0.0760 | | | −55.7342 |
| S3 | aspheric | −6.9756 | 2.4370 | 1.656 | 21.52 | −26.3067 |
| S4 | aspheric | −23.8834 | 0.0743 | | | −99.0000 |
| S5 | aspheric | 27.0922 | 1.0100 | 1.546 | 56.11 | −52.0706 |
| S6 | aspheric | 9.1956 | 1.3154 | | | 1.6587 |
| S7 | aspheric | 20.5453 | 1.1350 | 1.546 | 56.11 | −65.9621 |
| S8 | aspheric | 6.0029 | 0.5730 | | | 6.4171 |
| S9 | spherical | infinite | 0.2100 | 1.517 | 64.17 | |
| S10 | spherical | infinite | 3.5766 | | | |
| S11 | spherical | infinite | | | | |

TABLE 17

| surface number | A4 | A6 | A8 | A10 | A12 | A14 |
|---|---|---|---|---|---|---|
| S1 | −8.7927E−04 | −1.7372E−04 | −7.8794E−06 | −4.8667E−06 | 0 | 0 |
| S2 | 1.9857E−04 | −2.0234E−03 | 4.3986E−04 | −3.5462E−05 | 0 | 0 |
| S3 | 4.5195E−03 | −1.8244E−03 | 4.6683E−04 | −3.5331E−05 | 0 | 0 |
| S4 | 3.9446E−04 | 4.6860E−03 | −8.0377E−04 | 3.7516E−05 | 0 | 0 |
| S5 | −2.5836E−02 | 1.1621E−02 | −2.1980E−03 | 1.1528E−04 | 0 | 0 |
| S6 | −3.6963E−02 | 9.2692E−03 | −2.0189E−03 | 1.5033E−04 | 0 | 0 |
| S7 | −5.0300E−02 | 5.2044E−03 | −3.6358E−03 | 2.0647E−03 | −6.8624E−04 | 8.5310E−05 |
| S8 | −3.9352E−02 | 4.1385E−03 | −4.0156E−04 | −8.3119E−05 | 2.5457E−05 | −3.2518E−06 |

TABLE 18

| parameter | f1 (mm) | f2 (mm) | f3 (mm) | f4 (mm) | f (mm) | TTL (mm) | ImgH (mm) |
|---|---|---|---|---|---|---|---|
| numerical value | 5.60 | −15.92 | −26.02 | −15.97 | 12.39 | 12.53 | 3.18 |

Figures 12A, 12B:
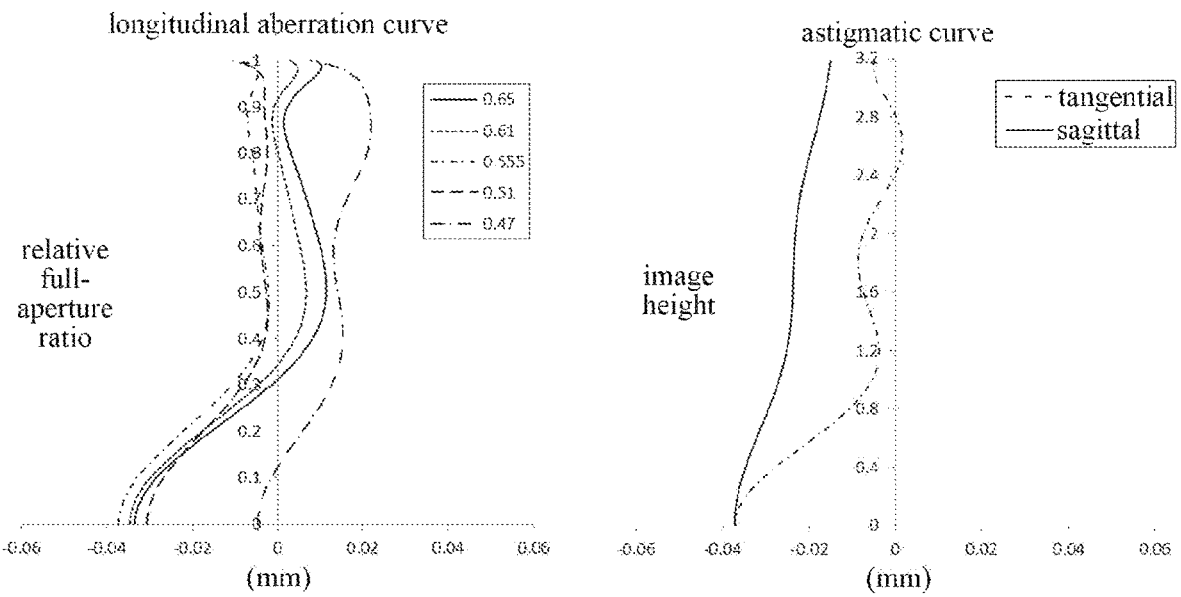
FIGS. 12A-12C respectively illustrate a longitudinal aberration curve, an astigmatic curve and a distortion curve of the optical lens assembly according to embodiment 6.
Figure 12C:
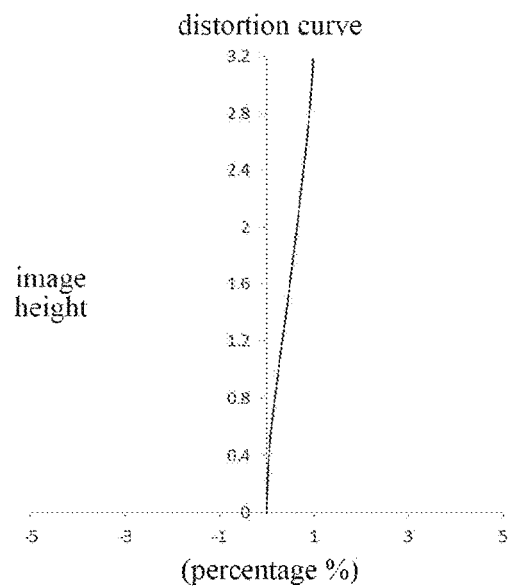

FIG. 12A illustrates a longitudinal aberration curve of the optical lens assembly according to embodiment 6, representing deviations of focal points of light of different wavelengths converged after passing through the optical lens assembly. FIG. 12B illustrates an astigmatic curve of the optical lens assembly according to embodiment 6, representing a curvature of a tangential image plane and a curvature of a sagittal image plane. FIG. 12C illustrates a distortion curve of the optical lens assembly according to embodiment 6, representing amounts of distortion at different viewing angles. It can be known according to FIGS. 12A-12C that the optical lens assembly provided in embodiment 6 can achieve a good image quality.

To sum up, embodiment 1 to embodiment 6 respectively satisfy the relations shown in Table 19 below.

TABLE 19

| Conditional formula | Embodiment | | | | | |
|---|---|---|---|---|---|---|
|  | 1 | 2 | 3 | 4 | 5 | 6 |
| HFOV | 14.2 | 14.1 | 14.1 | 14.2 | 14.2 | 14.2 |
| T34/CT4 | 1.10 | 1.11 | 1.16 | 1.16 | 1.08 | 1.16 |
| f123/f | 0.79 | 0.79 | 0.80 | 0.79 | 0.79 | 0.80 |
| (R2−R3)/(R2+R3) | 0.35 | 0.38 | 0.42 | 0.44 | 0.95 | 0.16 |
| T23/T34 | 0.07 | 0.07 | 0.08 | 0.06 | 0.11 | 0.06 |
| |f3/f4| | 0.32 | 0.00 | 0.07 | 0.14 | 0.01 | 0.61 |
| |f1/f2| | 0.60 | 0.47 | 0.51 | 0.50 | 0.48 | 0.35 |
| ΣCT/TTL | 0.54 | 0.53 | 0.53 | 0.54 | 0.51 | 0.54 |
| SD11/SD42 | 1.31 | 1.37 | 1.41 | 1.41 | 1.45 | 1.23 |
| |V2−V1| | 34.6 | 34.6 | 34.6 | 34.6 | 34.6 | 34.6 |
| TTL/f | 1.01 | 1.00 | 1.00 | 1.01 | 1.01 | 1.01 |

The present disclosure further provides an imaging device, having a photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical lens assembly described above.

The foregoing descriptions are merely illustrations for the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, for example, technical solutions formed by replacing the above features as disclosed in the present disclosure with (but not limited to) technical features having similar functions.

What is claimed is:

1. An optical lens assembly, comprising sequentially a first lens, a second lens, a third lens and a fourth lens from an object side to an image side along an optical axis,
    wherein the first lens has a positive refractive power, and an object-side surface of the first lens is a convex surface;
    the second lens has a negative refractive power, and an object-side surface of the second lens is a concave surface;
    the third lens has a positive refractive power or a negative refractive power; and
    the fourth lens has a negative refractive power,
    wherein an air spacing T23 between the second lens and the third lens on the optical axis and an air spacing T34 between the third lens and the fourth lens on the optical axis satisfy:

$T23/T34<0.2$, and wherein an axial distance TTL from the object-side surface of the first lens to an image plane of the optical lens assembly and a total effective focal length f of the optical lens assembly satisfy:

$0.8<TTL/f<1.05$.

2. The optical lens assembly according to claim 1, wherein a combined refractive power of the first lens, the second lens and the third lens is a positive refractive power.

3. The optical lens assembly according to claim 1, having a half of a maximal field-of-view angle HFOV, wherein the half of the maximal field-of-view angle HFOV satisfies:

$HFOV≤20°$.

4. The optical lens assembly according to claim 2, having a total effective focal length f, wherein a combined focal length f123 of the first lens, the second lens and the third lens and the total effective focal length f satisfy:

$0.6<f123/f<1.0$.

5. The optical lens assembly according to claim 1, wherein the air spacing T34 between the third lens and the fourth lens on the optical axis and a center thickness CT4 of the fourth lens on the optical axis satisfy:

$0.9<T34/CT4<1.4$.

6. The optical lens assembly according to claim 1, wherein a radius of curvature R2 of an image-side surface of the first lens and a radius of curvature R3 of the object-side surface of the second lens satisfy:

$$0<(R2-R3)/(R2+R3)\le 1.0.$$

7. The optical lens assembly according to claim 1, wherein an effective focal length f4 of the fourth lens and an effective focal length f3 of the third lens satisfy:

$$|f4/f3|<1.$$

8. The optical lens assembly according to claim 1, wherein an effective focal length f1 of the first lens and an effective focal length f2 of the second lens satisfy:

$$|f1/f2|<1.$$

9. The optical lens assembly according to claim 1, wherein a sum of center thicknesses ΣCT of each of the first to fourth lenses on the optical axis and an axial distance TTL from the object-side surface of the first lens to an image plane of the optical lens assembly satisfy:

$$0.4<\Sigma CT/TTL<0.6.$$

10. The optical lens assembly according to claim 1, wherein an effective radius SD11 of the object-side surface of the first lens and an effective radius SD42 of an image-side surface of the fourth lens satisfy:

$$1.0<SD11/SD42<1.5.$$

11. The optical lens assembly according to claim 1, wherein an abbe number V2 of the second lens and an abbe number V1 of the first lens satisfy:

$$|V2-V1|>30.$$

12. An optical lens assembly, comprising sequentially a first lens, a second lens, a third lens and at least one subsequent lens from an object side to an image side along an optical axis, and having a total effective focal length f,
wherein the first lens has a positive refractive power, and an object-side surface of the first lens is a convex surface;
the second lens has a negative refractive power, and an object-side surface of the second lens is a concave surface; and
the third lens has a positive refractive power or a negative refractive power,
wherein a combined refractive power of the first lens, the second lens and the third lens is a positive refractive power, and a combined focal length f123 of the first lens, the second lens and the third lens and the total effective focal length f satisfy:

$$0.6<f123/f<1.0,$$

and;
wherein a radius of curvature R2 of an image-side surface of the first lens and a radius of curvature R3 of the object-side surface of the second lens satisfy:

$$0<(R2-R3)/(R2+R3)<1.0,$$

wherein the at least one subsequent lens includes a fourth lens having a negative refractive power, and an air spacing T34 between the third lens and the fourth lens on the optical axis and a center thickness CT4 of the fourth lens on the optical axis satisfy:

$$0.9<T34/CT4<1.4.$$

13. The optical lens assembly according to claim 12, wherein an effective focal length f1 of the first lens and an effective focal length f2 of the second lens satisfy:

$$|f1/f2|<1.$$

14. The optical lens assembly according to claim 12, wherein an abbe number V2 of the second lens and an abbe number V1 of the first lens satisfy:

$$|V2-V1|>30.$$

15. The optical lens assembly according to claim 12, wherein an effective radius SD11 of the object-side surface of the first lens and an effective radius SD42 of an image-side surface of the fourth lens satisfy:

$$1.0<SD11/SD42<1.5.$$

16. The optical lens assembly according to claim 12, wherein an axial distance TTL from the object-side surface of the first lens to an image plane of the optical lens assembly and the total effective focal length f of the optical lens assembly satisfy:

$$0.8<TTL/f<1.05.$$

17. The optical lens assembly according to claim 16, having a half of a maximal field-of-view angle HFOV, wherein the half of the maximal field-of-view angle HFOV satisfies:

$$HFOV\le 20°.$$

* * * * *